United States Patent [19]

Williams

[11] 4,050,713
[45] Sept. 27, 1977

[54] CAMBERING DEVICE FOR CAMBERING VEHICLE

[75] Inventor: Jerry K. Williams, Sterling Heights, Mich.

[73] Assignee: General Motors Corporation, Detroit, Mich.

[21] Appl. No.: 727,592

[22] Filed: Sept. 28, 1976

[51] Int. Cl.² ............. B62K 15/00; B60G 19/10
[52] U.S. Cl. ................. 280/278; 280/112 A; 280/221; 280/293
[58] Field of Search ........... 280/278, 287, 112 R, 280/112 A, 87 R, 87 A, 87.04 R, 87.04 A, 282, 283, 293, 200, 210, 214, 218, 220, 221, 253, 256, 270, 224, 21 R, 21 A, 12.1, 12 H; 180/25 R, 25 A, 26 R, 41

[56] References Cited
U.S. PATENT DOCUMENTS

| | | | |
|---|---|---|---|
| 1,703,174 | 2/1929 | Roe | 280/287 X |
| 2,593,974 | 4/1952 | Brown | 280/21 R |
| 2,771,145 | 11/1956 | Peters | 180/26 |
| 3,033,585 | 5/1962 | Marston et al. | 280/12.1 X |
| 3,229,782 | 1/1966 | Hilton | 180/26 |
| 3,623,749 | 11/1971 | Jensen | 280/287 X |
| 3,964,563 | 6/1976 | Allen | 180/41 X |

FOREIGN PATENT DOCUMENTS

| | | | |
|---|---|---|---|
| 454,337 | 1/1950 | Italy | 280/293 |
| 49-42586 | 11/1974 | Japan | 280/87 R |

Primary Examiner—Joseph F. Peters, Jr.
Assistant Examiner—Jack D. Rubenstein
Attorney, Agent, or Firm—Edward J. Biskup

[57] ABSTRACT

A cambering vehicle having pivoted trailing arms interconnected through a cambering device including a two-piece bell crank that allows the trailing arms to be locked together and folded towards the vehicle frame so as to provide a compact package which can be readily stowed.

3 Claims, 3 Drawing Figures

CAMBERING DEVICE FOR CAMBERING VEHICLE

This invention concerns cambering vehicles and more particularly relates to a cambering vehicle having a cambering device that incorporates a two-piece bell crank in which the parts thereof can be locked in various positions so as to permit the vehicle to be operated normally, collapsed into a compact configuration for stowage purposes, or parked on a level or inclined surface.

Copending patent application Ser. No. 713,411, filed Aug. 11, 1976 entitled "Cambering Vehicle" and assigned to the assignee of this invention concerns a cambering vehicle employing a cambering device which allows the trailing arms thereof to be locked relative to each other and folded towards the steering frame so that the frame and trailing arms are positioned adjacent each other and extend in generally the same direction. In this manner, the vehicle is collapsible into a low profile configuration and provides a rigid package that can be grasped in one hand and placed in a relatively small compartment such as the trunk of an automobile. Two forms of cambering devices are disclosed by the aforementioned patent application with one employing cables and the other having link members for interconnecting the trailing arms and realizing controlled relative movement thereof as the vehicle negotiates a turn.

This invention contemplates a cambering vehicle of the above-described type in which the cambering device is characterized by having a two-piece bell crank that interconnects the trailing arms and includes a locking arrangement that allows the members of the bell crank to be locked from relative movement so the vehicle can be parked on a level or inclined surface. In addition, the members of the bell crank can be rotated relative to each other and locked in position so that the trailing arms are located adjacent the steering frame of the vehicle for stowage purposes. More specifically, the cambering device incorporated with this vehicle has a bell crank consisting of a pair of members which are mounted by a pivot pin on the steering frame for independent rotational movement about a common axis. One of the members has a semi-circular shape and is formed with a curved guide slot that is located on a circle having its center coaxially aligned with the center of the pivot pin. The other member takes the form of an elongated bar and is in overlapping relationship with the semi-circular member. A lock device is carried by the bar-shaped member and has a portion thereof extending through the slot for securing the two members of the bell crank together in a first position wherein the trailing arms are located for normal operation of the vehicle and in a second position wherein the trailing arms are located adjacent the steering frame. A second locking device is carried by the steering frame and also has a portion extending through the slot for maintaining the two members of the bell crank in a fixed position relative to the steering frame when the semi-circular and the bar-shaped members are in the first position and in the second position so as to allow parking of the vehicle and facilitate stowage thereof.

The objects of the present invention are to provide a new and improved cambering vehicle having pivoted trailing arms and including a cambering device that has a two-piece bell crank which is combined with a pair of locking devices for selectively securing the two members of the bell crank in relative angular positions so as to allow the trailing arms to maintain a normal vehicle operating position, a stowed position, and a parked position; to provide an improved cambering device for a cambering vehicle having a bell crank consisting of a pair of members which are independently rotatable about a common axis and can be locked in angularly related positions so as to permit the vehicle to be parked, operated in a conventional manner, or collapsed into a low profile configuration for stowage purposes; and to provide an improved cambering device for a cambering vehicle which through a pair of locking devices allows two independent parts of a bell crank to be rotated into predetermined positions for collapsing the steering frame towards the trailing arms, and for positioning the trailing arms for normal operation of the vehicle.

Other objects and advantages of the present invention will be more apparent from the following detailed description when taken with the drawings in which.

Figure 1:
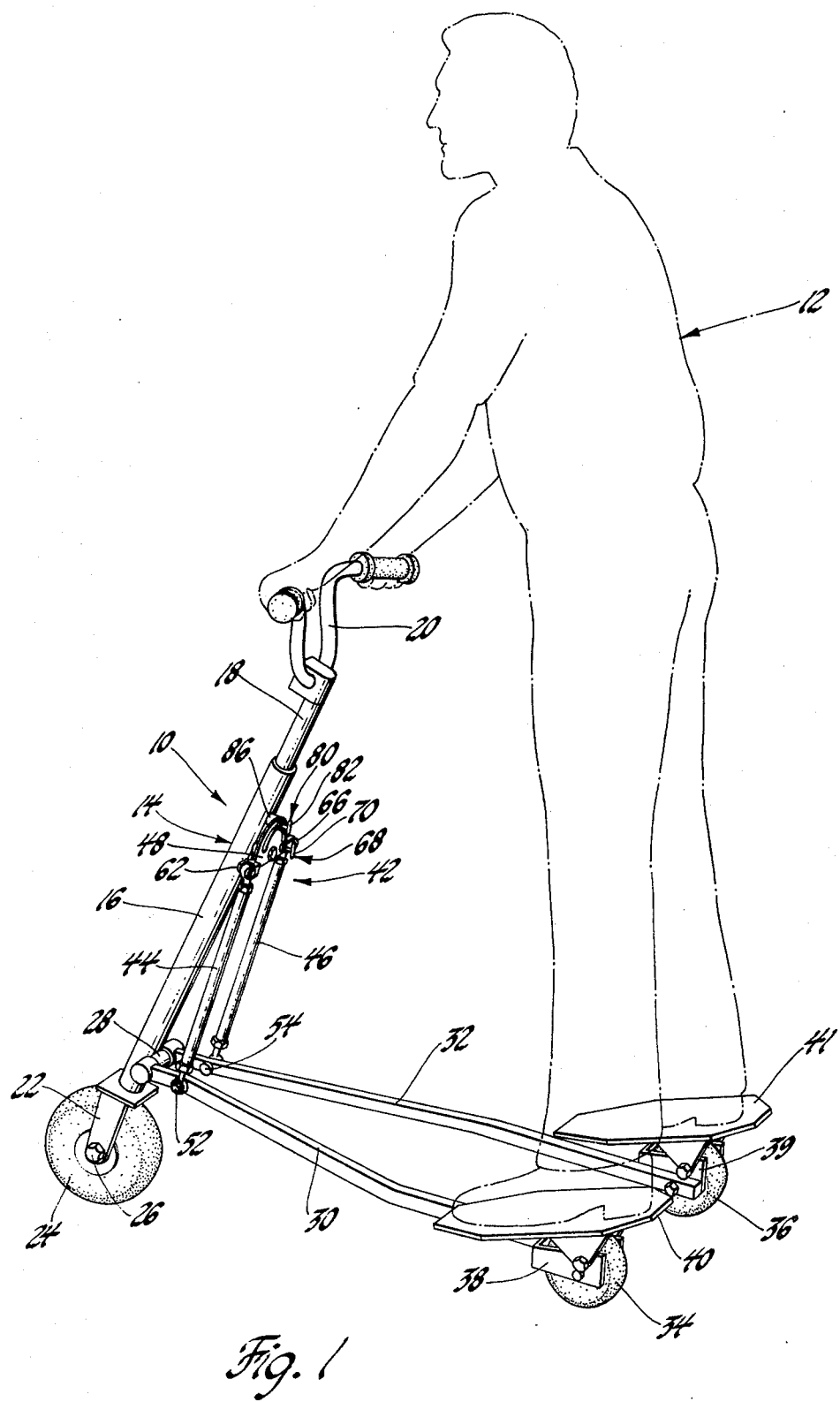
FIG. 1 is a perspective view showing a cambering vehicle incorporating a cambering device made in accordance with the invention.
Figure 2:
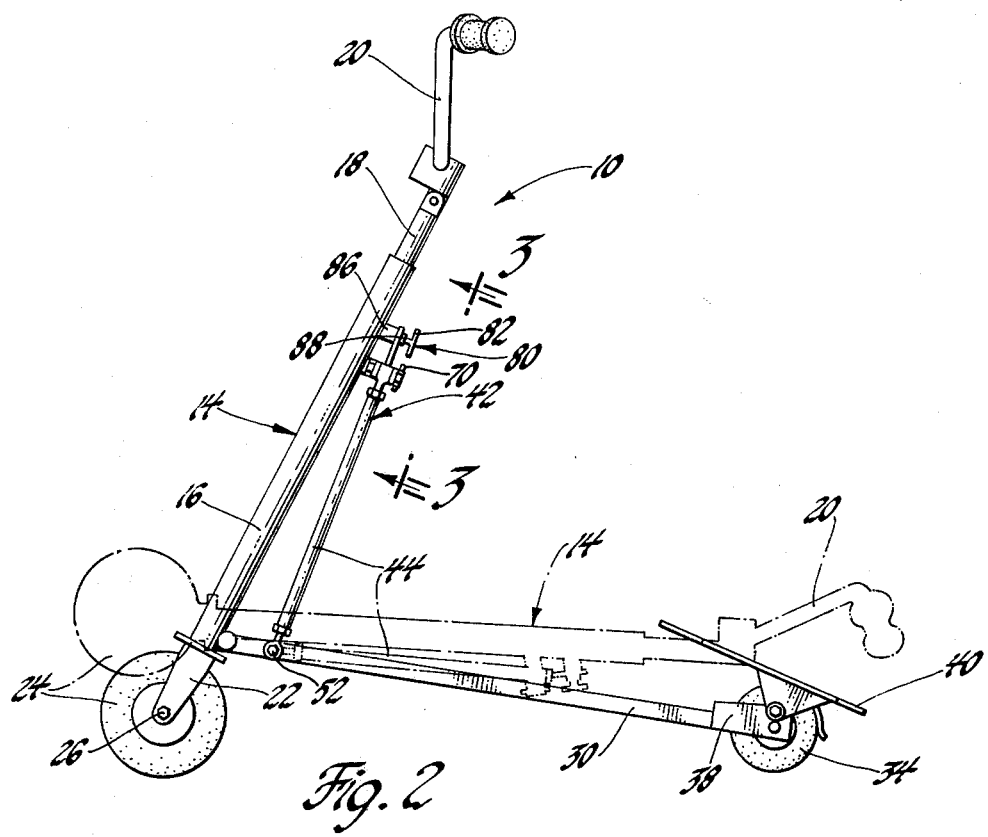
FIG. 2 is a side elevational view showing the steering frame of the cambering vehicle of FIG. 1 in the normal operating position and also in a folded position.

Referring to FIGS. 1 and 2 of the drawings, a cambering vehicle 10 is shown which is adapted to be propelled forwardly by the natural input of a vehicle operator 12 through the timed shifting of his weight from one foot to the other coordinated with the left and right cambered steering of the vehicle in a sinuous path. It will be noted that a vehicle of this type is disclosed in copending patent application, Ser. No. 649,967 filed on Jan. 19, 1976 and entitled "Cambering Vehicle," and reference is made to such application for a full understanding of how the vehicle is operated. It will also be noted that although a manually propelled vehicle is shown in FIGS. 1 and 2, an internal combustion engine or an electric motor can be combined with the vehicle for driving the front wheel thereof.

The cambering vehicle 10 comprises a steering frame 14 which includes a tubular column 16 which serves to axially align and rotatably support an elongated steering shaft 18 which extends therethrough. The upper end of the steering shaft is provided with a handle bar assembly 20 while the lower end is formed with a fork 22 which rotatably supports the front wheel 24 of the vehicle. The wheel 24 rotates on an axle 26 which extends transversely through and is supported by the fork 22. The lower end of the tubular column 16 is rigidly formed with a transverse shaft 28, the outer ends of which pivotally support the front ends of a pair of laterally spaced trailing arms 30 and 32 which extend rearwardly and terminate with rear wheels 34 and 36 respectively supported for rotation by a pair of brackets 38 and 39, which in turn, pivotally support foot pads 40 and 41.

A cambering device 42 made according to the invention serves to interconnect the trailing arms 30 and 32 and control movement thereof when the vehicle is leaned into a turn. The cambering device 42 includes a pair of links 44 and 46 and a bell crank comprising a pair of members 48 and 50. The lower ends of the links 44 and 46 are connected to the front portions of the trailing arms 30 and 32 by transversely extending pivot bolt members 52 and 54, respectively, while the upper ends of the links 44 and 46 are connected to the members 48 and 50 by longitudinally extending pivot bolt members 56 and 58, respectively. Each of the pivot bolt members 56 and 58 includes a spherical bearing means (not shown) which allows the upper end of the associated link to pivot about an axis perpendicular to the longitudinal pivot axis of the pivot bolt member. As a result, each of the pivot bolt members 56 and 58 permit universal pivotal movement of the upper end of the associated link member. This allows the steering frame 14 to be folded towards the trailing arms 30 and 32 as seen in phantom lines in FIG. 2.

Figure 3:
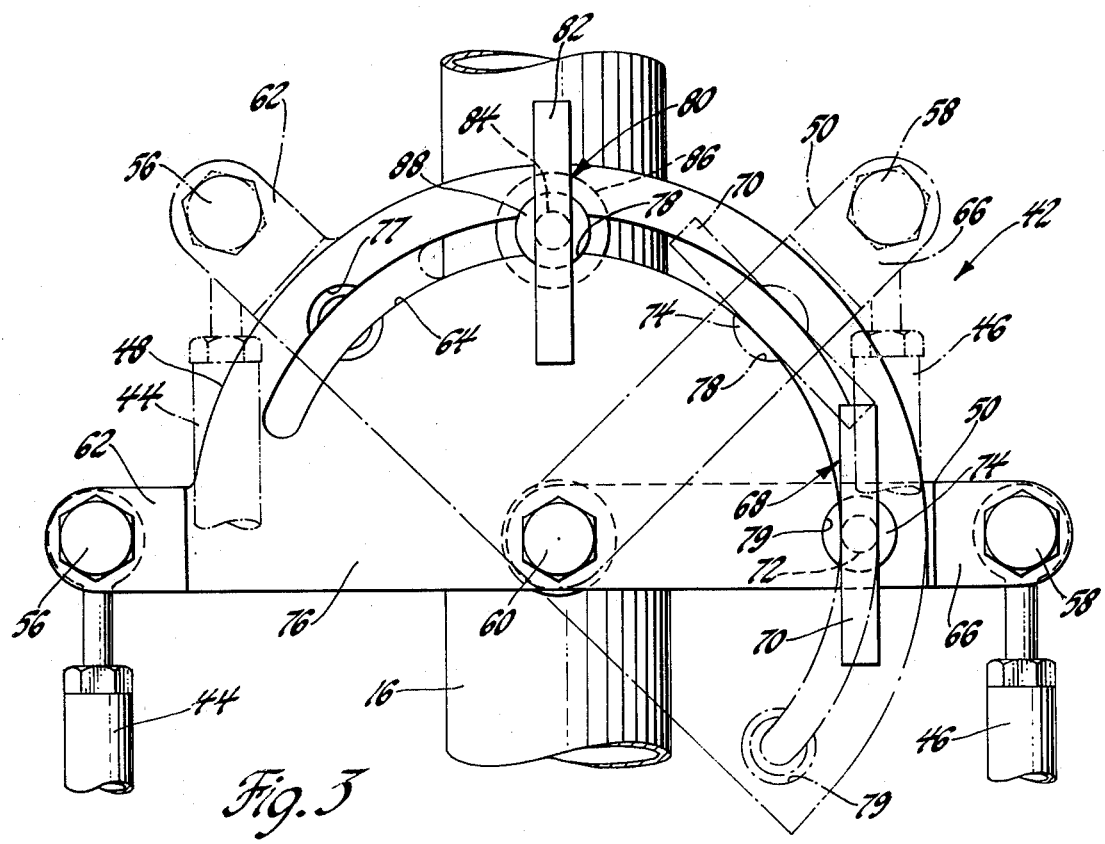
FIG. 3 is an enlarged view showing the bell crank portion of the cambering device.

As seen in FIG. 3, the bell crank members 48 and 50 are supported for pivotal movement by a pivot pin or bolt 60 which is secured to the upper portion of the tubular column 16. The member 48 takes the form of a semi-circular plate which includes a laterally extending integral U-shaped bracket 62 which universally pivotally supports the upper end of the link 44. The member 48 also is formed with an arcuate guide slot 64 located on a circle having its center coaxial with the center of the pivot bolt 60. The other member 50 is shaped as an elongated bar and also terminates with an integral U-shaped bracket 66 which is identical to bracket 62 and universally pivotally supports the upper end of link 46.

A locking device 68 is carried by the member 50 and includes a handle 70 secured to the outer end of a cylindrical shaft 72 the inner end of which extends through the slot 64 and is threadedly received by the member 50. The shaft 72 is rigidly formed with enlarged circular head 74 located adjacent to the outer surface 76 of the member 48 so that upon clockwise rotation of the handle 70, the head 74 will frictionally engage the opposed sides of the slot 64 in the member 48 and force the latter into frictional engagement with the member 50. By doing so, the two members 48 and 50 of the bell crank can be locked together in fixed relative positions and, in this connection, it will be noted that the member 48 has three circular wells 77, 78 and 79 formed therein along the slot 64 that serve to position the members 48 and 50 relative to each other in predetermined positions for purposes which will hereinafter be explained.

A locking device 80 identical to the locking device 68 is mounted on the tubular column 16 and, in this regard, it will be noted that the locking device 80 also includes a handle 82 rigidly secured to the outer end of a cylindrical shaft 84, the inner end of which extends through the slot 64 and is threadedly received by a boss 86 fixed with the column 16. The shaft 84 is also rigidly formed with an enlarged circular head 88 which is adapted to engage the outer surface 76 of the member 48 on opposed sides of the slot 64 and draw the member 48 into locking frictional engagement with the boss 86 when the handle 82 is rotated in a clockwise direction.

During normal operation of the cambering vehicle 10, the trailing arms 30 and 32 are free to pivot in opposite directions up and down about the support shaft 28 with the movement of the trailing arms being controlled by the cambering device 42. The operating position of the members 48 and 50 of the bell crank during the normal operation of the vehicle is as shown in full lines in FIG. 3. In order to maintain the members 48 and 50 in the fixed relative positions shown, the handle 70 of the locking device 68 would be rotated in clockwise direction drawing the members into engagement and causing the head 74 to be seated in the well 79. Thus, the members 48 and 50 are frictionally locked to each other and, at the same time, the handle 82 of the locking device 80 would be rotated in a counterclockwise direction so that the head 88 is spaced from the outer surface 76 thereby permitting the two parts of the bell crank to be free to rotate as a unit about the pivot bolt 60 and allow the trailing arms 30 and 32 to move up and down as controlled by the links 44 and 45 when the vehicle is leaned into a turn.

After the vehicle has been operated, the trailing arms 30 and 32 can be fixed in relative positions for parking purposes by rotating the handle 82 of locking device 80 in a clockwise direction to cause the head 88 to engage the outer surface 76 and thereby clamp the bell crank to the column 16. As a result, movement of the trailing arms 30 and 32 through the links 44 and 46 is prevented. It will be noted that the vehicle can be parked either on a level surface or an inclined surface. When the vehicle is parked on an inclined surface, the centers of the pivot bolt members 56 and 58 will be located in an inclined plane which will be substantially parallel to the incline on which the vehicle is parked. On a level surface, the bell crank will assume the full line position of FIG. 3, and clockwise rotation of the handle 82 will cause the head 88 to seat in the well 78 and cause locking of the bell crank to the column 16.

The above-described cambering device also allows the vehicle 10 to be folded and locked into a compact configuration as seen in FIG. 2. In other words, the steering frame 14 can be collapsed towards the trailing arms 30 and 32 so that the steering frame 14 assumes the phantom line position relative to the trailing arms. This can be realized by first placing both locking devices 68 and 82 in an unlocked condition so that the members 48 and 50 are not locked to each other nor locked to the tubular column 16. The member 48 is then rotated in a clockwise direction about pivot bolt 60 as seen in FIG. 3 until the well 77 is centrally aligned with the column 16 at which time the bracket 62 assumes the phantom line position. This is followed by rotating the member 50 in a counterclockwise direction to the phantom line position so that the head 74 is axially aligned with the well 78 which has now been rotated 45° to the right of its aligned position with the column 16 due to the repositioning of the member 48. Both handles 70 and 82 of locking devices 68 and 80 are then rotated in a clockwise direction to lock the two members 48 and 50 together and the entire bell crank to the tubular column 16. As should be apparent when the members 48 and 50 are moved to the phantom line positions of FIG. 3, the steering frame 14 pivots about the longitudinal center of shaft 28 to the phantom line or folded position of FIG. 2 and, with the locking devices 68 and 80 in the locked condition, any part of the vehicle 10 can be grasped in one hand and the vehicle can be carried to an area where it is to be stowed.

Various changes and modifications can be made in this construction without departing from the spirit of the invention. Such changes and modifications are contemplated by the inventor and he does not wish to be limited except by the scope of the appended claims.

I claim:

1. In combination with a cambering vehicle having a steering frame the lower portion of which is provided with a pair of pivotally supported trailing arms, a mechanical cambering device for interconnecting the trailing arms so they move in equal and opposite directions when the vehicle is leaned into a turn, said cambering device including a bell crank comprising a pair of members mounted on said steering frame for pivotal movement about a common axis, a pair of equalizer links, means pivotally connecting one of said links between one of said members and one of said trailing arms, means pivotally connecting the other of said links between the other of said members and the other of said trailing arms, a first lock device carried by one of said members for securing said members together in a first position wherein said trailing arms are located for normal operation of said vehicle and in a second position wherein said trailing arms are located adjacent said frame so that the vehicle can be stowed in a minimum of space, and a second lock device carried by said frame for maintaining said bell crank in a fixed position relative to said frame when said members are in said first and second positions.

2. In combination with a cambering vehicle having a steering frame the lower portion of which is provided with a pair of pivotally supported trailing arms, a mechanical cambering device for interconnecting the trailing arms so they move in equal and opposite directions when the vehicle is leaned into a turn, said cambering device including a bell crank comprising first and second overlapping members mounted on said steering frame for independent pivotal movement about a common axis, a slot formed in said first member and located on a circle having its center at said common axis, a pair of equalizer links, means pivotally connecting one of said links between said first member and one of said trailing arms, means pivotally connecting the other of said links between said second member and the other of said trailing arms, a first lock device having a rotatable portion carried by one of said members for securing said first and second members together in a first position wherein said trailing arms are located for normal operation of said vehicle and in a second position wherein said trailing arms are located adjacent said frame so that the vehicle can be stowed in a minimum of space, and a second lock device having a rotatable portion carried by said frame for maintaining said bell crank in a fixed position relative to said frame when said first and second members are in said first and second positions.

3. In combination with a cambering vehicle having a steering frame the lower portion of which is provided with a pair of pivotally supported trailing arms, a mechanical cambering device for interconnecting the trailing arms so that they move in equal and opposite directions when the vehicle is leaned into a turn, said cambering device including a bell crank comprising a semi-circular member and an elongated member mounted on said steering frame for independent pivotal movement about a common axis, a slot formed in said semi-circular member and located on a circle having its center at said common axis, a pair of rigid equalizer links, means pivotally connecting one of said links between one of said members and one of said trailing arms, means pivotally connecting the other of said links between the other of said members and the other of said trailing arms, a first manually operated lock device carried by said elongated member and having a portion extending through said slot for securing said semi-circular and elongated members together in a first position wherein said trailing arms are located for normal operation of said vehicle and in a second position wherein said trailing arms are located adjacent said frame so that the vehicle can be stowed in a minimum of space, and a second manually operated lock device carried by said frame and having a portion extending through said slot for maintaining said bell crank in a fixed position relative to said frame when the semi-circular and elongated members are in said first and second positions.

* * * * *